(12) United States Patent
Fujita

(10) Patent No.: US 10,780,877 B2
(45) Date of Patent: Sep. 22, 2020

(54) HEAT EXCHANGE SYSTEM FOR VEHICLE, HEAT EXCHANGE METHOD FOR VEHICLE, AND STORAGE MEDIUM

(71) Applicant: HONDA MOTOR CO., LTD., Minato-ku, Tokyo (JP)

(72) Inventor: Takahito Fujita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 157 days.

(21) Appl. No.: 16/112,898

(22) Filed: Aug. 27, 2018

(65) Prior Publication Data

US 2019/0077392 A1    Mar. 14, 2019

(30) Foreign Application Priority Data

Sep. 8, 2017  (JP) ................................ 2017-173032

(51) Int. Cl.
*B60W 20/00* (2016.01)
*B60W 10/30* (2006.01)
(Continued)

(52) U.S. Cl.
CPC ............ *B60W 20/00* (2013.01); *B60K 11/02* (2013.01); *B60K 13/04* (2013.01); *B60L 58/26* (2019.02); *B60W 10/30* (2013.01); *F01P 3/20* (2013.01); *F01P 7/16* (2013.01); *F01P 7/165* (2013.01); *F28F 27/00* (2013.01); *B60K 2001/005* (2013.01); *B60K 2001/008* (2013.01); *B60L 2240/36* (2013.01); *B60W 2510/0676* (2013.01); *B60W 2510/087* (2013.01);
(Continued)

(58) Field of Classification Search
CPC ....... B60W 20/00; B60W 10/30; B60L 58/26; B60K 11/02; B60K 13/04; B60K 2001/008; F28F 27/00; F01P 7/165; F01P 3/20; F01P 7/16; F01P 2025/50; F01P 2050/24
See application file for complete search history.

(56) References Cited

U.S. PATENT DOCUMENTS 9,643,469 B2 * 5/2017 Kakehashi ............. B60K 11/02
10,167,769 B2 * 1/2019 Auerbach ................. F01P 3/20
(Continued)

FOREIGN PATENT DOCUMENTS

JP          3016335 B2 * 3/2000
JP       2017-100606    6/2017

*Primary Examiner* — Jon T. Schermerhorn, Jr.
(74) *Attorney, Agent, or Firm* — Amin, Turocy & Watson, LLP

(57) ABSTRACT

A heat exchange system for a vehicle includes: a first cooling circuit (L1-1, L1-2) is configured to cool an internal combustion engine a second cooling circuit (L2-1, L2-2) is configured to cool a driving electric motor outputs a driving force; a first heat exchanger (106) is configured to exchange heat between the first cooling circuit and the second cooling circuit; a first sensor (151) is configured to detect a temperature of the first cooling circuit; a second sensor (152) is configured to detect a temperature of the second cooling circuit; and a controller (155) is configured to execute control of performing heat exchange between a coolant in the first cooling circuit and a coolant in the second cooling circuit using the first heat exchanger when the temperature detected by the first sensor is lower than the temperature detected by the second sensor.

11 Claims, 10 Drawing Sheets

(51) Int. Cl.
*F28F 27/00* (2006.01)
*F01P 3/20* (2006.01)
*F01P 7/16* (2006.01)
*B60K 11/02* (2006.01)
*B60L 58/26* (2019.01)
*B60K 13/04* (2006.01)
*B60K 1/00* (2006.01)

(52) U.S. Cl.
CPC .... *B60W 2510/246* (2013.01); *F01P 2023/00* (2013.01); *F01P 2025/50* (2013.01); *F01P 2050/24* (2013.01); *F01P 2060/16* (2013.01)

(56) References Cited

U.S. PATENT DOCUMENTS

| | | | | |
|---|---|---|---|---|
| 2009/0000779 | A1* | 1/2009 | Hickam | G05D 23/1931 165/299 |
| 2013/0111932 | A1* | 5/2013 | Mishima | B60L 58/27 62/79 |
| 2016/0318499 | A1* | 11/2016 | Yamanaka | B60H 1/00899 |
| 2019/0152343 | A1* | 5/2019 | Onozawa | F02N 19/10 |

* cited by examiner

HEAT EXCHANGE SYSTEM FOR VEHICLE, HEAT EXCHANGE METHOD FOR VEHICLE, AND STORAGE MEDIUM

CROSS-REFERENCE TO RELATED APPLICATION

Priority is claimed on Japanese Patent Application No. 2017-173032, filed Sep. 8, 2017, the content of which is incorporated herein by reference.

BACKGROUND OF THE INVENTION

Field of the Invention

The invention relates to a heat exchange system for a vehicle, a heat exchange method for a vehicle, and a storage medium.

Description of Related Art

Hybrid vehicles having a storage battery and an internal combustion engine mounted therein have spread (for example, see Japanese Unexamined Patent Application, First Publication No. 2017-100606).

SUMMARY OF THE INVENTION

In a hybrid vehicle, there is a requirement for managing heat in the vehicle. However, in the related art, heat in a vehicle may not be satisfactorily managed.

An aspect of the invention has been invented in consideration of the above-mentioned circumstances and an objective thereof is to provide a heat exchange system for a vehicle, a heat exchange method for a vehicle, and a storage medium that can accurately manage heat in a vehicle.

A heat exchange system for a vehicle, a heat exchange method for a vehicle, and a storage medium according to the invention employ the following configurations.

(1) According to an aspect of the invention, there is provided a heat exchange system for a vehicle including: a first cooling circuit is configured to cool an internal combustion engine; a second cooling circuit is configured to cool a driving electric motor which outputs a driving force for traveling; a first heat exchanger is configured to exchange heat between the first cooling circuit and the second cooling circuit; a first sensor is configured to detect the temperature of the first cooling circuit; a second sensor is configured to detect the temperature of the second cooling circuit; and a controller is configured to execute control of performing heat exchange between a coolant in the first cooling circuit and a coolant in the second cooling circuit using the first heat exchanger when the temperature detected by the first sensor is lower than the temperature detected by the second sensor.

(2) In the heat exchange system for a vehicle according to the aspect of (1), the controller is configured to execute control of performing the heat exchange using the first heat exchanger according to an operation plan of the internal combustion engine.

(3) The heat exchange system for a vehicle according to the aspect of (2) further includes an operation plan creator is configured to create an operation plan of the driving electric motor and the internal combustion engine according to a traveling plan of the vehicle in which the heat exchange system for a vehicle is mounted.

(4) The heat exchange system for a vehicle according to the aspect of (3) further includes a heat exchange plan creator is configured to create a heat exchange plan for executing control of performing the heat exchange using the first heat exchanger according to the operation plan of the internal combustion engine.

(5) In the heat exchange system for a vehicle according to the aspect of (4), the heat exchange plan is a plan in which the temperature of the driving electric motor is curbed to be lower than a first threshold value.

(6) The heat exchange system for a vehicle according to any one of the aspects of (1) to (5) further includes: a third cooling circuit is disposed in an exhaust heat recovering device connected to the internal combustion engine; a fourth cooling circuit is configured to cool a storage battery which supplies electric power to the driving electric motor; a second heat exchanger is configured to exchange heat between the third cooling circuit and the fourth cooling circuit; a third sensor is configured to detect a temperature of the third cooling circuit; and a fourth sensor is configured to detect a temperature of the fourth cooling circuit, and the controller is configured to execute control of performing heat exchange between the third cooling circuit and the fourth cooling circuit using the second heat exchanger when the temperature detected by the third sensor is lower than the temperature detected by the fourth sensor.

(7) In the heat exchange system for a vehicle according to the aspect of (6), the controller is configured to execute control of performing the heat exchange using the second heat exchanger according to an operation plan of the internal combustion engine.

(8) The heat exchange system for a vehicle according to the aspect of (7) further includes a heat exchange plan creator is configured to create a heat exchange plan for executing control of performing the heat exchange using the second heat exchanger according to the operation plan of the internal combustion engine.

(9) In the heat exchange system for a vehicle according to the aspect of (8), the heat exchange plan is a plan in which the temperature of the storage battery supplying electric power to the driving electric motor is curbed to be lower than a second threshold value.

(10) According to an aspect of (10), there is provided a heat exchange method for a vehicle, causing a computer to perform: detecting a temperature of a first cooling circuit is configured to cool an internal combustion engine; detecting a temperature of a second cooling circuit is configured to cool a driving electric motor which outputs a driving force for traveling; and executing control of performing heat exchange between a coolant in the first cooling circuit and a coolant in the second cooling circuit using a first heat exchanger is configured to exchange heat between the first cooling circuit and the second cooling circuit when the temperature of the first cooling circuit is lower than the temperature of the second cooling circuit.

(11) According to an aspect of (11), there is provided a storage medium causing a computer to perform: detecting a temperature of a first cooling circuit is configured to cool an internal combustion engine; detecting a temperature of a second cooling circuit is configured to cool a driving electric motor which outputs a driving force for traveling; and executing control of performing heat exchange between a coolant in the first cooling circuit and a coolant in the second cooling circuit using a first heat exchanger is configured to exchange heat between the first cooling circuit and the second cooling circuit when the temperature of the first cooling circuit is lower than the temperature of the second cooling circuit.

According to the aspects of (1) to (11), it is possible to accurately manage heat in a vehicle.

BRIEF DESCRIPTION OF THE DRAWINGS

FIG. 9 is a flowchart showing a flow of a process routine which is performed by a heat exchange plan creator or the like;

DETAILED DESCRIPTION OF THE INVENTION

Hereinafter, a heat exchange system for a vehicle, a heat exchange method for a vehicle, and a storage medium according to an embodiment of the invention will be described with reference to the accompanying drawings.

First Embodiment

[Entire Configuration]

Figure 1:
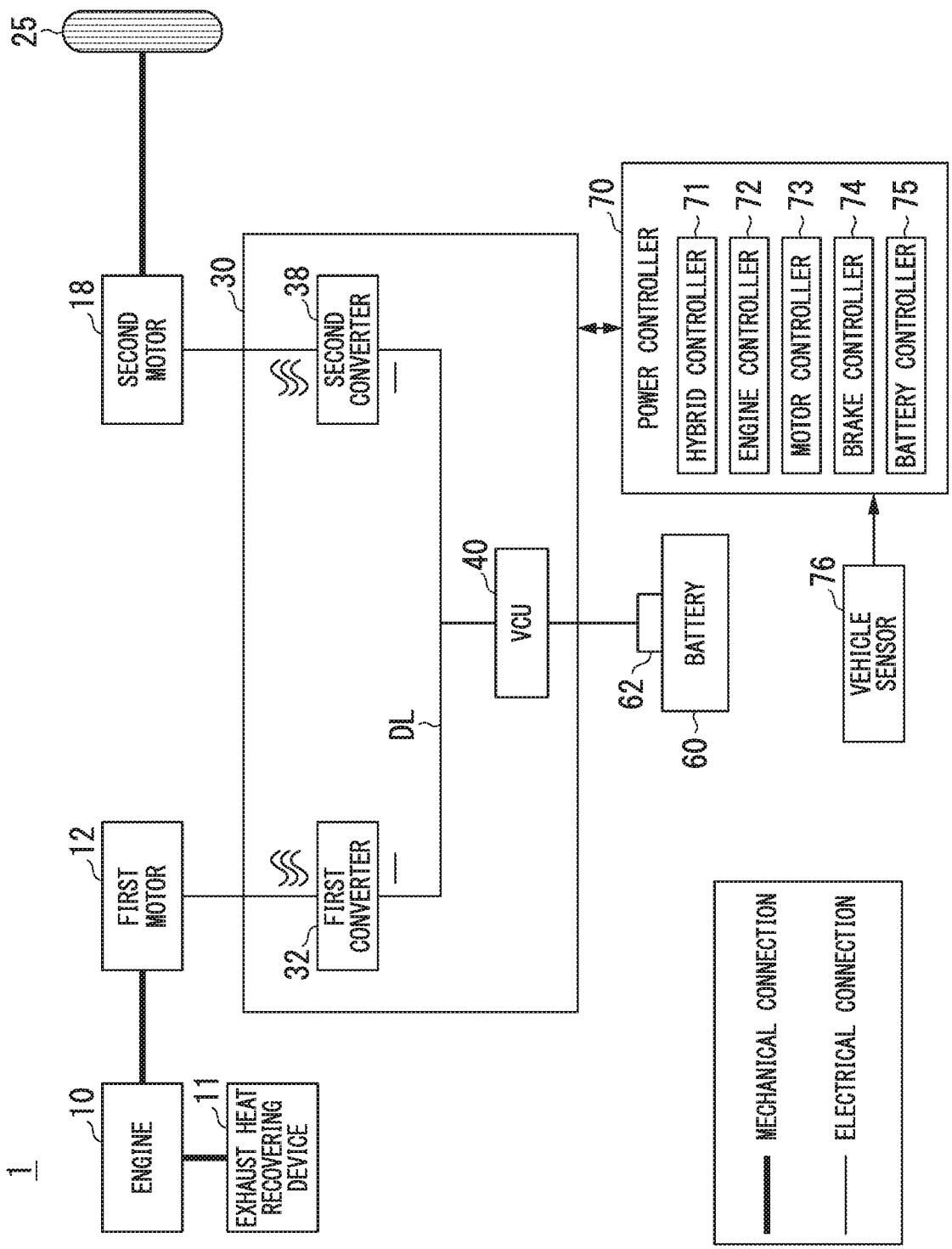
FIG. 1 is a diagram showing an example of a configuration of a vehicle in which a vehicle system including a cooling system is mounted.

FIG. 1 is a diagram showing an example of a configuration of a vehicle in which a vehicle system 1 including a cooling system is mounted. The vehicle in which the vehicle system 1 is mounted is, for example, a vehicle with two wheels, three wheels, or four wheels and a drive source thereof is an internal combustion engine such as a diesel engine or a gasoline engine, an electric motor, or a combination thereof. When the vehicle includes an electric motor, the electric motor operates using electric power generated by a power generator connected to the internal combustion engine or electric power discharged from a secondary battery or a fuel cell. In the following description, a hybrid vehicle employing a series system will be described as an example. A series system is a system in which an engine is not mechanically connected to driving wheels, the power of the engine is used exclusively for power generation by a power generator, and the generated power is supplied to a traveling electric motor. This vehicle may be a vehicle in which a battery can be charged in a plug-in manner.

As shown in FIG. 1, for example, an engine 10, an exhaust heat recovering device 11, a first motor (a power generator) 12, a second motor (an electric motor) 18, driving wheels 25, a power control unit (PCU) 30, and a battery 60 are mounted in the vehicle.

The engine 10 is an internal combustion engine that outputs power by combusting fuel such as gasoline. The engine 10 is, for example, a reciprocating engine including a cylinder, a piston, an intake valve, an exhaust valve, a fuel injector, an ignition plug, a connecting rod, and a crank shaft. The engine 10 is, for example, a four-cycle engine, but another-cycle engine may be used. Any of a diesel engine, a gas turbine engine, a rotary engine, and an external combustion engine may be used as the engine 10 as long as it generates power. The power which can be output from the engine 10 is a power less than the power which is required for the first motor 12 to generate an amount of power for driving the second motor 18 in real time (or an amount of power capable of causing a host vehicle M to travel at a predetermined speed or higher). The engine 10 has a small size and a small weight, and thus has a merit that the degree of freedom in vehicle layout is high.

The exhaust heat recovering device 11 is mechanically connected to the engine 10. The exhaust heat recovering device 11 recovers energy in exhaust gas discharged from the engine 10 and transmits the recovered energy to a predetermined place in the vehicle.

The first motor 12 is, for example, a three-phase AC power generator. A rotor of the first motor 12 is connected to an output shaft (for example, a crank shaft) of the engine 10, and the first motor 12 generates electric power using power output from the engine 10.

The second motor 18 is, for example, a three-phase AC electric motor. A rotor of the second motor 18 is connected to the driving wheels 25. The second motor 18 outputs power to the driving wheels 25 using electric power supplied thereto. The second motor 18 generates electric power using the kinetic energy of the vehicle at the time of deceleration of the vehicle. Hereinafter, the power generating operation of the second motor 18 may be referred to as regeneration.

The PCU 30 includes, for example, a first converter 32, a second converter 38, and a voltage control unit (VCU) 40. A configuration in which these elements are bundled in a single PCU 30 is only an example, and these elements may be arranged by being distributed.

The first converter 32 and the second converter 38 are, for example, AC-DC converters that convert AC into DC. DC-side terminals of the first converter 32 and the second converter 38 are connected to a DC link DL. The DC link DL is connected to a battery 60 via the VCU 40. The first converter 32 converts AC power generated by the first motor 12 into DC power and outputs the DC power to the DC link DL, or converts DC power supplied via the DC link into AC power and supplies the AC power to the first motor 12. Similarly, the second converter 38 converts AC power generated by the second motor 18 into DC power and outputs the DC power to the DC link DL, or converts DC power supplied via the DC link DL into AC power and supplies the AC power to the second motor 18.

The VCU 40 is, for example, a DC-DC converter that converts DC power of a first voltage into DC power of a second voltage. The VCU 40 steps up electric power supplied from the battery 60 and outputs the stepped-up electric power to the DC link DL.

The battery 60 is a secondary battery such as a lithium-ion battery.

A power controller 70 includes, for example, a hybrid controller 71, an engine controller 72, a motor controller 73, a brake controller 74, and a battery controller 75. The hybrid controller 71 outputs an instruction to the engine controller 72, the motor controller 73, the brake controller 74, and the battery controller 75. The instruction from the hybrid controller 71 will be described later.

The engine controller 72 performs ignition control, throttle opening control, fuel injection control, fuel-cut control, and the like of the engine 10 in accordance with an instruction from the hybrid controller 71. The engine controller 72 may calculate an engine rotation speed according to an output of a crank angle sensor attached to the crank shaft and output the calculated engine rotation speed to the hybrid controller 71.

The motor controller 73 performs switching control of switching elements of the first converter 32 and/or the second converter 38 between an ON state and an OFF state in accordance with an instruction from the hybrid controller 71.

The brake controller 74 controls a brake device which is not shown in accordance with an instruction from the hybrid controller 71. The brake device is a device that outputs brake torques corresponding to a driver's braking operation to the wheels.

The battery controller 75 calculates an amount of electric power (for example, a state of charge) of the battery 60 according to an output of a battery sensor 62 attached to the battery 60 and outputs the calculated amount of electric power to the hybrid controller 71.

A vehicle sensor 76 includes, for example, an accelerator depression sensor, a vehicle speed sensor, and a brake depression sensor. The accelerator depression sensor is attached to an accelerator pedal which is an example of an operator receiving an acceleration instruction from a driver, detects an amount of depression of the accelerator pedal, and outputs the detected amount of depression as an accelerator depression amount to the power controller 70. The vehicle speed sensor includes, for example, a wheel speed sensor attached to each wheel and a speed calculator. The vehicle speed sensor derives a speed of the vehicle (a vehicle speed) by combining wheel speeds detected by the wheel speed sensors and outputs the derived speed to the power controller 70. The brake depression sensor is attached to a brake pedal which is an example of an operator receiving a deceleration or stop instruction from a driver. The brake depression sensor detects an amount of depression of the brake pedal and outputs the detected amount of depression as a brake depression amount to the power controller 70.

Control by the hybrid controller 71 will be described now. The hybrid controller 71 first derives a drive-shaft required torque Td according to the accelerator depression amount and a target vehicle speed, and determines a drive-shaft required power Pd which is to be output from the second motor 18 according to the derived drive-shaft required torque Td. The hybrid controller 71 determines whether the engine 10 is to operate according to the determined drive-shaft required power Pd, power consumption of an auxiliary machine or an amount of electric power of the battery 60, or the like. When it is determined that the engine 10 is to operate, the hybrid controller 71 determines an engine power Pe which is to be output from the engine 10.

The hybrid controller 71 determines a reaction torque of the first motor 12 such that it matches the engine power Pe according to the determined engine power Pe. The hybrid controller 71 outputs the determined information to the engine controller 72. When a brake is operated by a driver, the hybrid controller 71 determines a distribution between a brake torque which is to be output by regeneration in the second motor 18 and a brake torque which is to be output from the brake device, and outputs the determined distribution to the motor controller 73 and the brake controller 74.

[Cooling System]

Figure 2:
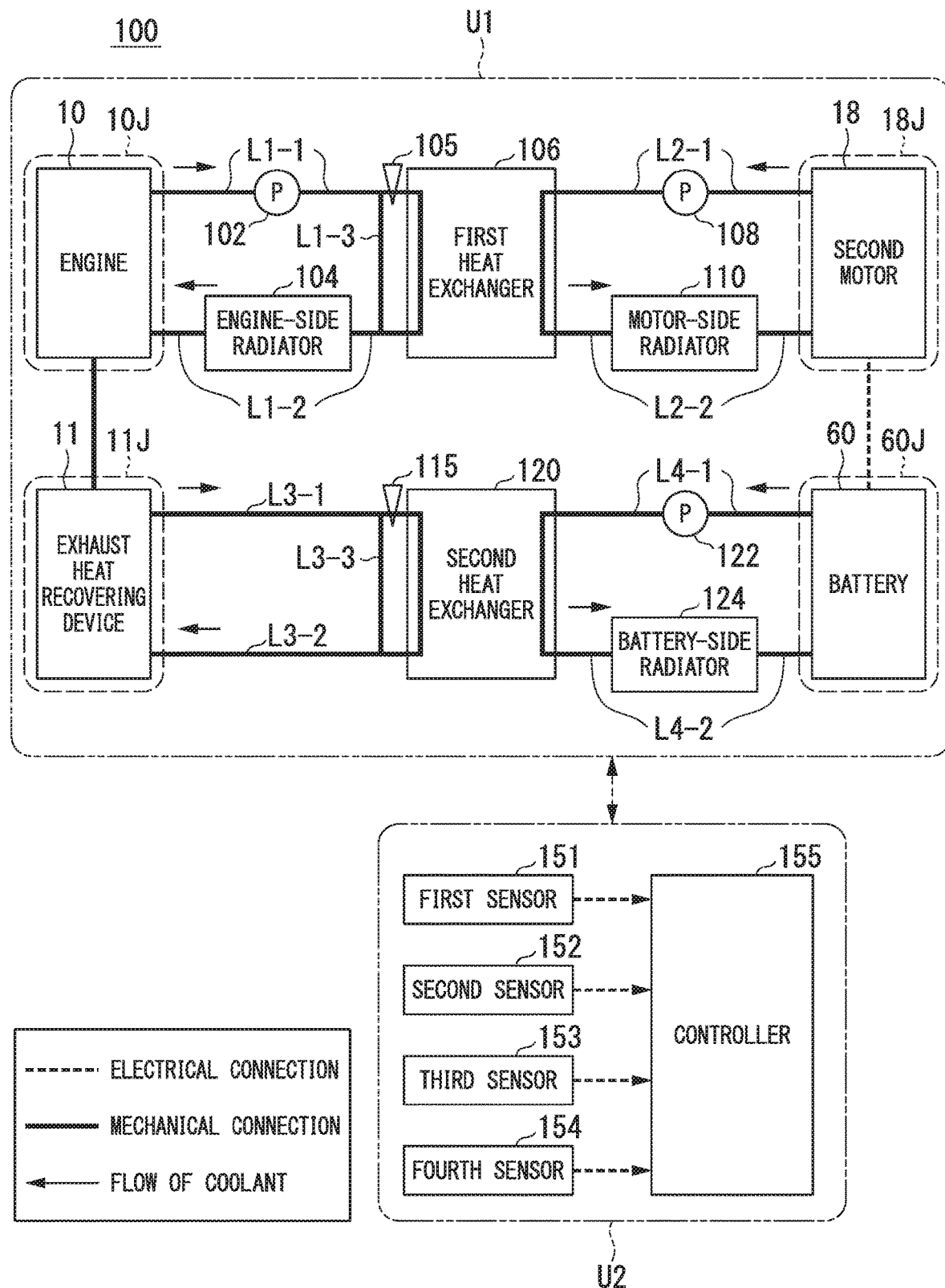
FIG. 2 is a diagram showing a functional configuration other than the configuration of the vehicle system shown in FIG. 1.

FIG. 2 is a diagram showing a functional configuration other than the configuration of the vehicle system 1 shown in FIG. 1. The vehicle system 1 includes, for example, a cooling system 100. The cooling system 100 includes, for example, a cooling unit U1 and a control unit U2.

[Cooling Unit]

The cooling unit U1 includes, for example, a water jacket 10J, a water jacket 11J, a water jacket 18J, and a water jacket 60J. The water jacket 10J is a flow passage in which a coolant is able to flow and which is disposed outside the cylinder of the engine 10. The water jacket 11J is, for example, a flow passage in which a coolant is able to flow and which is disposed outside the exhaust heat recovering device 11. The water jacket 18J is, for example, a flow passage in which a coolant is able to flow and which is disposed outside the second motor 18. The water jacket 60J is, for example, a flow passage in which a coolant is able to flow and which is disposed outside the battery 60.

The cooling unit U1 includes, for example, an engine-side cooling circuit L1-1, an engine-side cooling circuit L1-2, a communication circuit L1-3, an engine-side pump 102, an engine-side radiator 104, a valve 105, a first heat exchanger 106, a motor-side cooling circuit L2-1, a motor-side cooling circuit L2-2, a motor-side pump 108, and a motor-side radiator 110.

[Engine-Side Cooling Circuit]

The engine-side cooling circuits L1-1 and L1-2 are pipes connecting the water jacket 10J and the first heat exchanger 106. In the engine-side cooling circuit L1-1, the engine-side pump 102 is provided between the engine 10 and the first heat exchanger 106. In the engine-side cooling circuit L1-2, the engine-side radiator 104 is provided between the engine 10 and the first heat exchanger 106.

The communication circuit L1-3 is a circuit connecting the engine-side cooling circuits L1-1 and L1-2. A first end of the communication circuit L1-3 is disposed between the engine-side pump 102 and the first heat exchanger 106, and a second end thereof is disposed between the engine-side radiator 104 and the first heat exchanger 106.

The valve 105 is disposed between a position at which the engine-side cooling circuit L1-1 is connected to the communication circuit L1-3 and the first heat exchanger 106. When the temperature of a coolant in the engine-side cooling circuit L1-1 is equal to or higher than a first threshold value, the valve 105 is controlled by the controller 155 such that it is in an open state. An open state refers to a state in which a coolant flows into the first heat exchanger 106. The valve 105 or a valve 115 which will be described later may be a valve which is switched to an open state at a predetermined temperature.

The engine-side pump 102 is, for example, an electric pump which is driven by driving a motor which operates with electric power. The engine-side radiator 104 dissipates, for example, heat of the coolant flowing from the first heat exchanger 106 side.

The engine-side pump 102 receives a coolant in the water jacket 10J and discharges the coolant to the first heat exchanger 106 side. Accordingly, the coolant in the water jacket 10J circulates in the order of the engine-side cooling circuit L1-1, the engine-side pump 102, the engine-side cooling circuit L1-1, the first heat exchanger 106, the engine-side cooling circuit L1-2, the engine-side radiator 104, the engine-side cooling circuit L1-2, and the water jacket 10J.

The engine-side cooling circuits L1-1 and L1-2 may be circuits in which an engine lubricant flows instead of the circuits in which a coolant flows. In this case, the engine-side cooling circuits L1-1 and L1-2 are directly connected to the first heat exchanger 106 and the engine 10.

[Motor-Side Cooling Circuit]

The motor-side cooling circuits L2-1 and L2-2 are pipes connecting the water jacket 18J and the first heat exchanger 106. In the motor-side cooling circuit L2-1, the motor-side pump 108 is disposed between the second motor 18 and the first heat exchanger 106. In the motor-side cooling circuit L2-2, the motor-side radiator 110 is disposed between the second motor 18 and the first heat exchanger 106.

The motor-side pump 108 is, for example, an electric pump which is driven by driving a motor which operates with electric power. The motor-side radiator 110 dissipates, for example, heat of the coolant flowing from the first heat exchanger 106 side.

The motor-side pump 108 receives a coolant in the water jacket 18J and discharges the coolant to the first heat exchanger 106 side. Accordingly, the coolant in the water jacket 18J circulates in the order of the motor-side cooling circuit L2-1, the motor-side pump 108, the motor-side cooling circuit L2-1, the first heat exchanger 106, the motor-side cooling circuit L2-2, the motor-side radiator 110, the motor-side cooling circuit L2-2, and the water jacket 18J.

As a result, heat of the coolant circulating in the engine-side cooling circuit L1-1 and heat of the coolant circulating in the motor-side cooling circuit L2-1 are exchanged in the first heat exchanger 106.

The cooling unit U1 further includes, for example, a heat exhaust-side cooling circuit L3-1, a heat exhaust-side cooling circuit L3-2, a communication circuit L3-3, a second heat exchanger 120, a battery-side cooling circuit L4-1, a battery-side cooling circuit L4-2, a battery-side pump 122, and a battery-side radiator 124.

[Heat Exhaust-Side Cooling Circuit]

The heat exhaust-side cooling circuits L3-1 and L3-2 are pipes connecting the water jacket 11J and the second heat exchanger 120. The communication circuit L3-3 is a circuit connecting the heat exhaust-side cooling circuits L3-1 and L3-2. A first end and a second end of the communication circuit L3-3 are disposed between the water jacket 11J and the second heat exchanger 120.

The valve 115 is disposed between a position at which the heat exhaust-side cooling circuit L3-1 and the communication circuit L3-3 are connected and the second heat exchanger 120. The valve 115 is controlled such that it is in an open state by the controller 155 when the temperature of a coolant in the heat exhaust-side cooling circuit L3-1 is equal to or higher than a second threshold value. An open state refers to a state in which a coolant flows into the second heat exchanger 120.

When the temperature of the exhaust heat recovering device 11 increases, the coolant in the water jacket 11J circulates in the order of the heat exhaust-side cooling circuit L3-1, the second heat exchanger 120, the heat exhaust-side cooling circuit L3-2, and the water jacket 11J.

[Battery-Side Cooling Circuit]

The battery-side cooling circuits L4-1 and L4-2 are pipes connecting the water jacket 60J and the second heat exchanger 120. In the battery-side cooling circuit L4-1, the battery-side pump 122 is disposed between the battery 60 and the second heat exchanger 120. In the battery-side cooling circuit L4-2, the battery-side radiator 124 is disposed between the battery 60 and the second heat exchanger 120.

The battery-side pump 122 is, for example, an electric pump that is driven by driving a motor which operates with electric power. The battery-side radiator 124 dissipates, for example, heat of the coolant flowing from the second heat exchanger 120 side.

The battery-side pump 122 receives the coolant in the water jacket 60J and discharges the coolant to the second heat exchanger 120 side. Accordingly, the coolant in the water jacket 60J circulates in the order of the battery-side cooling circuit L4-1, the battery-side pump 122, the battery-side cooling circuit L4-1, the second heat exchanger 120, the battery-side cooling circuit L4-2, the battery-side radiator 124, the battery-side cooling circuit L4-2, and the water jacket 60J.

As a result, heat of the coolant circulating in the heat exhaust-side cooling circuit L3-1 and heat of the coolant circulating in the battery-side cooling circuit L4-1 are exchanged in the second heat exchanger 120.

[Control Unit]

The control unit U2 includes, for example, a first sensor 151, a second sensor 152, a third sensor 153, a fourth sensor 154, and a controller 155. The first sensor 151 detects the temperature of the engine-side cooling circuit L1-1. The second sensor 152 detects the temperature of the motor-side cooling circuit L2-1. The third sensor 153 detects the temperature of the heat exhaust-side cooling circuit L3-1. The fourth sensor 154 detects the temperature of the battery-side cooling circuit L4-1. The "temperature of the cooling circuit" that is detected by each sensor may be the temperature of the cooling circuit itself or may be an indicator indirectly indicating the temperature of the cooling circuit (for example, the temperature of the coolant in the cooling circuit). The controller 155 acquires the detection results from the first sensor 151, the second sensor 152, the third sensor 153, and the fourth sensor 154. The controller 155 controls the cooling unit U1 according to the detection results from the first sensor 151, the second sensor 152, the third sensor 153, and the fourth sensor 154. The details of this control will be described later.

[Flowchart]

Figure 3:
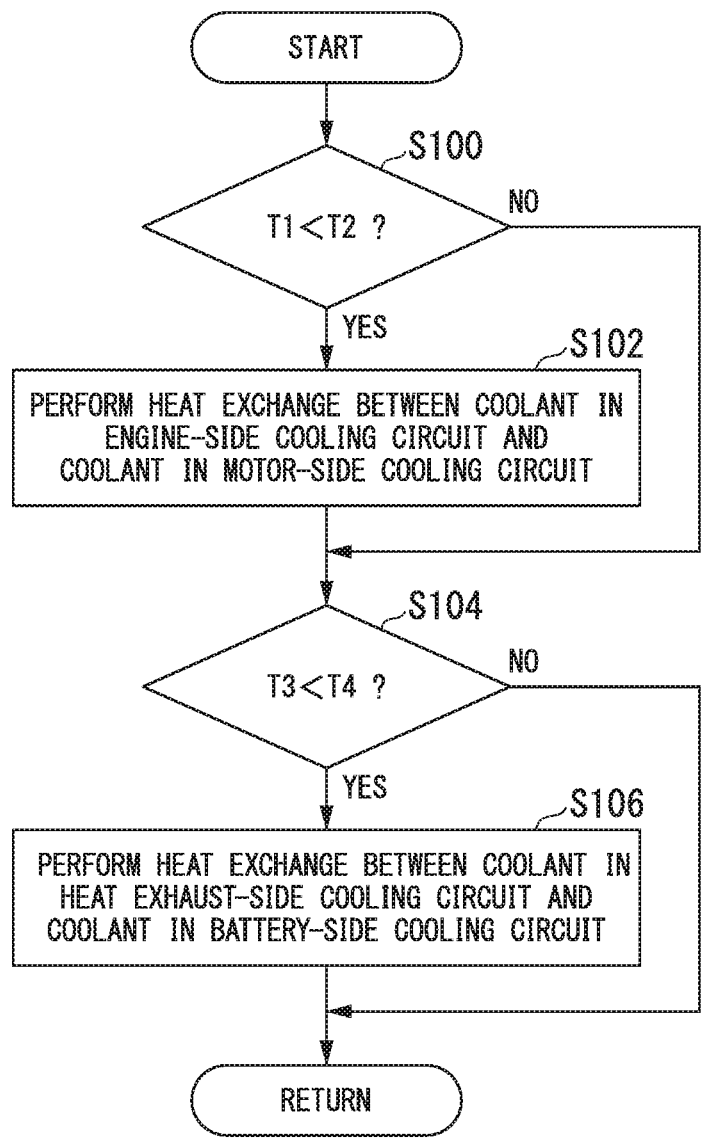
FIG. 3 is a flowchart showing a flow of a process routine which is performed by a controller.

FIG. 3 is a flowchart showing a flow of a process routine which is performed by the controller 155. The process routine of this flowchart is, for example, a process routine which is performed in a state in which the engine 10 has not been started.

First, the controller 155 determines whether the detection result from the first sensor 151 (hereinafter referred to as a temperature T1) is lower than the detection result from the second sensor 152 (hereinafter referred to as a temperature T2) (Step S100). When the temperature T1 is not lower than the temperature T2, the process routine transitions to Step S104.

When the temperature T1 is lower than the temperature T2, the controller 155 exchanges heat of the coolant in the engine-side cooling circuit L1-1 and heat of the coolant in the motor-side cooling circuit L2-1 (Step S102). The controller 155 performs the heat exchange by activating the engine-side pump 102, the motor-side pump 108, and a fan of the first heat exchanger 106 and controlling the valve 105 such that it is switched to the open state.

The coolant discharged from the engine-side pump 102 and the coolant discharged from the motor-side pump 108 flow into the first heat exchanger 106. Then, in the first heat exchanger 106, the heat of the coolant in the engine-side cooling circuit L1-1 and the heat of the coolant in the motor-side cooling circuit L2-1 are exchanged. As a result, the temperature of the coolant in the motor-side cooling circuit L2-2 becomes lower than that before the heat exchange has been performed, and thus cooling of the second motor 18 is promoted.

In Step S102, when the motor-side pump 108 has already been activated and the coolant in the motor-side cooling circuit L2-1 is cooled, the controller 155 performs the heat exchange by activating the engine-side pump 102 and the fan in the first heat exchanger 106 and controlling the valve 105 such that it is switched to the open state.

Then, the controller 155 determines whether the detection result from the third sensor 153 (hereinafter referred to as a temperature T3) is lower than the detection result from the fourth sensor 154 (hereinafter referred to as a temperature T4) (Step S104). When the temperature T3 is not lower than the temperature T4, this process routine of the flowchart ends.

When the temperature T3 is lower than the temperature T4, the controller 155 exchanges heat of the coolant in the heat exhaust-side cooling circuit L3-1 and heat of the coolant in the battery-side cooling circuit L4-1 (Step S106). The controller 155 performs the heat exchange by activating the battery-side pump 122 and a fan in the second heat exchanger 120 and controlling the valve 115 such that it is switched to the open state.

The coolant discharged from the battery-side pump 122 flows into the second heat exchanger 120, and the heat of the coolant in the heat exhaust-side cooling circuit L3-1 and the heat of the coolant in the battery-side cooling circuit L4-1 are exchanged in the second heat exchanger 120. By this heat exchange, the coolant in the heat exhaust-side cooling circuit L3-1 circulates in the heat exhaust-side cooling circuits L3-1 and L3-2. The heat exchange between the heat of the coolant in the heat exhaust-side cooling circuit L3-1 and the heat of the coolant in the battery-side cooling circuit L4-1 is continuously performed. As a result, the temperature of the coolant in the battery-side cooling circuit L4-2 becomes lower than that before the heat exchange has been performed, and thus cooling of the battery 60 is promoted. Accordingly, this process routine of the flowchart ends.

In Step S106, when the battery-side pump 122 has already been activated and the coolant in the battery-side cooling circuit L4-1 is cooled, the controller 155 performs the heat exchange by activating the fan in the second heat exchanger 120 and controlling the valve 115 such that it is switched to the open state.

Some of the above-mentioned processes may be skipped. For example, the processes of Steps S100 and S102 or the processes of Steps S104 and S106 may be skipped.

As described above, when the temperature of the coolant which is used to cool the engine 10 is lower than the temperature of the coolant which is used to cool the second motor 18, it is possible to promote cooling of the coolant on the motor 18 side by causing the controller 155 to exchange the heat of the coolant which is used to cool the engine 10 and the heat of the coolant which is used to cool the second motor 18. When the temperature of the coolant which is used to cool the battery 60 is lower than the temperature of the coolant which is used to cool the exhaust heat recovering device 11, it is possible to promote cooling of the coolant on the battery 60 side by causing the controller 155 to exchange the heat of the coolant which is used to cool the battery 60 and the heat of the coolant which is used to cool the exhaust heat recovering device 11. As a result, it is possible to more accurately manage heat in a vehicle.

According to the first embodiment, it is possible to more accurately manage heat in a vehicle by causing the controller 155 to exchange the heat of the coolant in the engine-side cooling circuit L1-1 and the heat of the coolant in the motor-side cooling circuit L2-1 or to exchange the heat of the coolant in the heat exhaust-side cooling circuit L3-1 and the heat of the coolant in the battery-side cooling circuit L4-1.

Second Embodiment

A second embodiment will be described below. In the second embodiment, the vehicle system 1 creates a plan for performing heat exchange according to a plan in which the second motor 18 is to operate and performs heat exchange in accordance with the created plan. Hereinafter, differences from the first embodiment will be mainly described.

Figure 4:
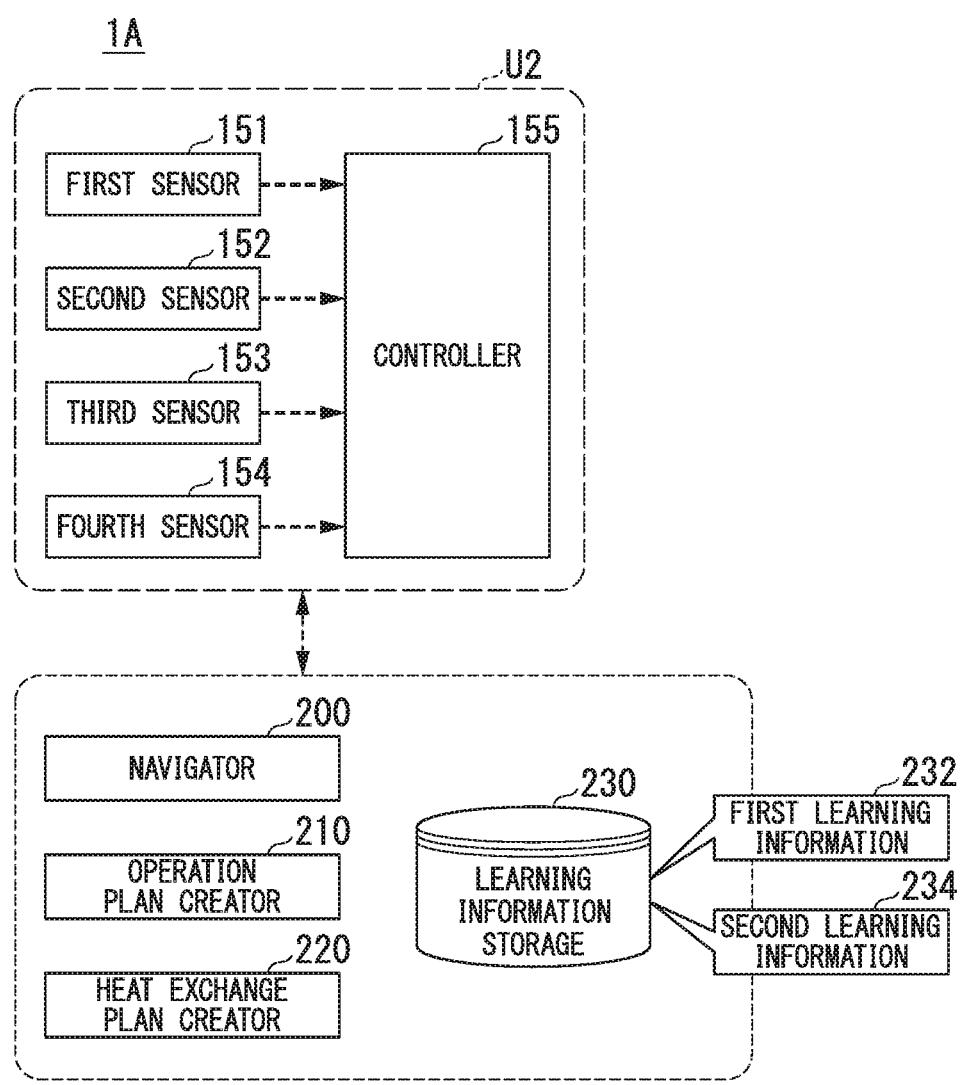
FIG. 4 is a diagram showing a functional configuration of a vehicle system according to a second embodiment.

FIG. 4 is a diagram showing a functional configuration of a vehicle system 1A according to the second embodiment. The vehicle system 1A includes, for example, a navigator 200, an operation plan creator 210, a heat exchange plan creator 220, and a learning information storage 230. The learning information storage 230 includes, for example, first learning information 232 and second learning information 234 (details of which will be described later).

[Traveling Plan]

The navigator 200 derives a traveling plan to a destination, for example, according to a destination of a vehicle, a route to the destination derived from map information, and conditions of a road (congestion conditions). A traveling plan includes a route or a traveling lane on which a vehicle travels to a destination and a traveling speed.

[Operation Plan]

The operation plan creator 210 creates an operation plan of the second motor 18 and the engine 10 according to the traveling plan which is derived by the navigator 200 and selected by an occupant of the vehicle. An operation plan is a plan in which the engine 10 or the second motor 18 is to operate in the traveling plan. The operation plan is made according to a current amount of electric power of the battery 60, an amount of electric power which is used to travel to a destination according to the traveling plan, and an amount of electric power stored for reservation. For example, the operation plan creator 210 derives an amount of electric power which is insufficient to travel to a destination with reference to the current amount of electric power of the battery 60. At this time, gradients of roads, congestion conditions of the roads, vehicle speeds on the roads, degrees of acceleration and deceleration, and the like which are included in the traveling plan are considered. For example, this is because when a time or a distance for which the vehicle travels on an uphill road is long, more electric power is consumed than that when the vehicle travels on a flat road. This is also because the power consumption varies depending on the congestion conditions of roads, vehicle speeds on the roads, or the degrees of acceleration and deceleration.

The operation plan creator 210 determines a time, a section, or the like in which the engine 10 operates to supplement the derived insufficient amount of electric power. The time in which the engine 10 operates is a time required for supplementing the insufficient amount of electric power by power generation. The section in which the engine 10 operates is a section satisfying predetermined conditions. Examples of the section satisfying the predetermined conditions include a section in which surrounding noise is predicted to be equal to or greater than a predetermined value such that an occupant does not feel engine sound and a section in which the vehicle travels on a predetermined road such as an arterial road.

Figure 5:
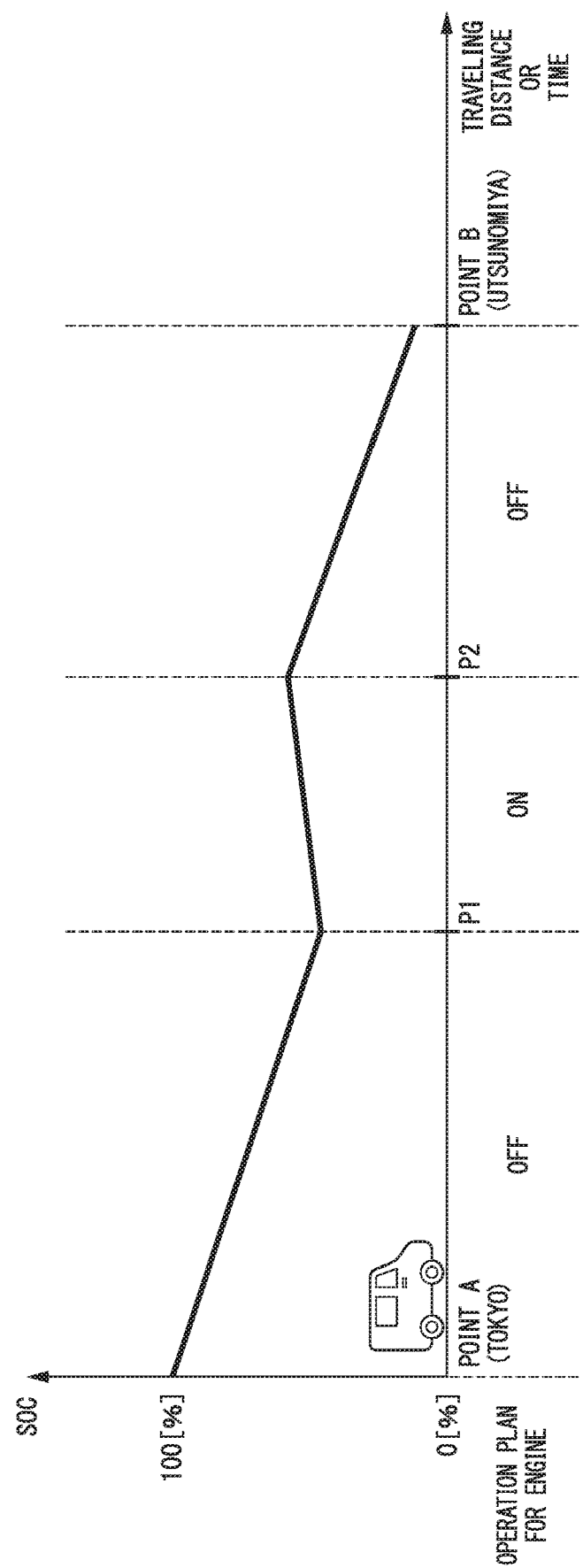
FIG. 5 is a diagram showing an example of an operation plan.

FIG. 5 is a diagram showing an operation of an operation plan. For example, it is assumed that a traveling plan with point A (for example, Tokyo) as a departure point and point B (for example, Utsunomiya) as a destination is made. In this case, the operation plan creator 210 derives an amount of electric power which needs to be generated according to an amount of electric power of the battery 60 and an amount of electric power required for traveling between point A (Tokyo) and point B (Utsunomiya). The operation plan creator 210 creates an operation plan for the engine 10 according to the derived amount of electric power. For example, the operation plan creator 210 creases an operation plan in which the engine 10 does not operate from point A (Tokyo) to point P1, the engine 10 operates to charge the battery 60 with the electric power generated by the operation from point P1 to point P2, and the engine 10 does not operate from point P2 to point B (Utsunomiya).

In this way, since the operation plan creator 210 creates a plan allowing the vehicle to travel from a departure point to a destination using electric power generated by the engine 10, it is possible to improve convenience to a user.

[Heat Exchange Plan Creator]

The heat exchange plan creator 220 creates a heat exchange plan which is a plan in which heat exchange is performed using the first heat exchanger 106 or the second heat exchanger 120 according to at least the operation plan for the engine 10 which is created by the operation plan creator 210. The controller 155 performs heat exchange according to the heat exchange plan which is created by the heat exchange plan creator 220.

The heat exchange plan creator 220 performs heat exchange (hereinafter referred to as first heat exchange) between the coolant in the engine-side cooling circuit L1-1 and the coolant in the motor-side cooling circuit L2-1 using the first heat exchanger 106 such that the temperature of the coolant for cooling the second motor 18 is not equal to nor higher than a predetermined temperature. For example, when the vehicle travels along a route in which the temperature of the coolant in the engine-side cooling circuit L1-1 is estimated to be equal to or lower than a first predetermined temperature and the temperature of the coolant in the motor-side cooling circuit L2-1 is estimated to be equal to or higher than a second predetermined temperature, the heat exchange plan creator 220 creates a heat exchange plan such that the temperature of the coolant for cooling the second motor 18 is not equal to nor higher than a third predetermined temperature.

The heat exchange plan creator 220 performs heat exchange (hereinafter referred to as second heat exchange) between the coolant in the heat exhaust-side cooling circuit L3-1 and the coolant in the battery-side cooling circuit L4-1 using the second heat exchanger 120 such that the temperature of the coolant for cooling the battery 60 is not equal to nor higher than a predetermined temperature. For example, when the vehicle travels along a route in which the temperature of the coolant in the heat exhaust-side cooling circuit L3-1 is estimated to be equal to or lower than a fourth predetermined temperature and the temperature of the coolant in the battery-side cooling circuit L4-1 is estimated to be equal to or higher than a fifth predetermined temperature, the heat exchange plan creator 220 creates a heat exchange plan such that the temperature of the coolant for cooling the battery 60 is not equal to nor than a sixth predetermined temperature.

The heat exchange plan creator 220 may be embodied, for example, by artificial intelligence (AI) or a function using a predetermined model. For example, when a traveling plan and an operation plan are input, the heat exchange plan creator 220 outputs information indicating whether a heat exchange plan is necessary or unnecessary, transitions of the temperatures of the coolants when the traveling plan and the operation plan are implemented, a heat exchange plan in which the temperature of the coolant for cooling the second motor 18 is lower than the third predetermined temperature or the temperature of the coolant for cooling the battery 60 is lower than the sixth predetermined temperature, and the like. The predetermined model is a model generated by mechanical learning or a model such as deep learning. These models are models which are generated according to learning data in which a traveling plan, an operation plan, transitions of the temperatures of the coolants, and a heat exchange plan are correlated with each other.

[Heat Exchange Plan]

The heat exchange plan creator 220 estimates whether the temperature of the second motor 18 or the temperature of the battery 60 becomes equal to or higher than a threshold value according to the traveling plan, the operation plan, and the first learning information 232 stored in the storage device. The first learning information 232 is information in which an increasing trend of the temperature of the second motor 18 and an increasing trend of the temperature of the battery 60 are correlated with contents of the traveling plan and the operation plan. The first learning information 232 is, for example, information which is acquired by experiment or information which is generated according to simulation or the like.

Figure 6:
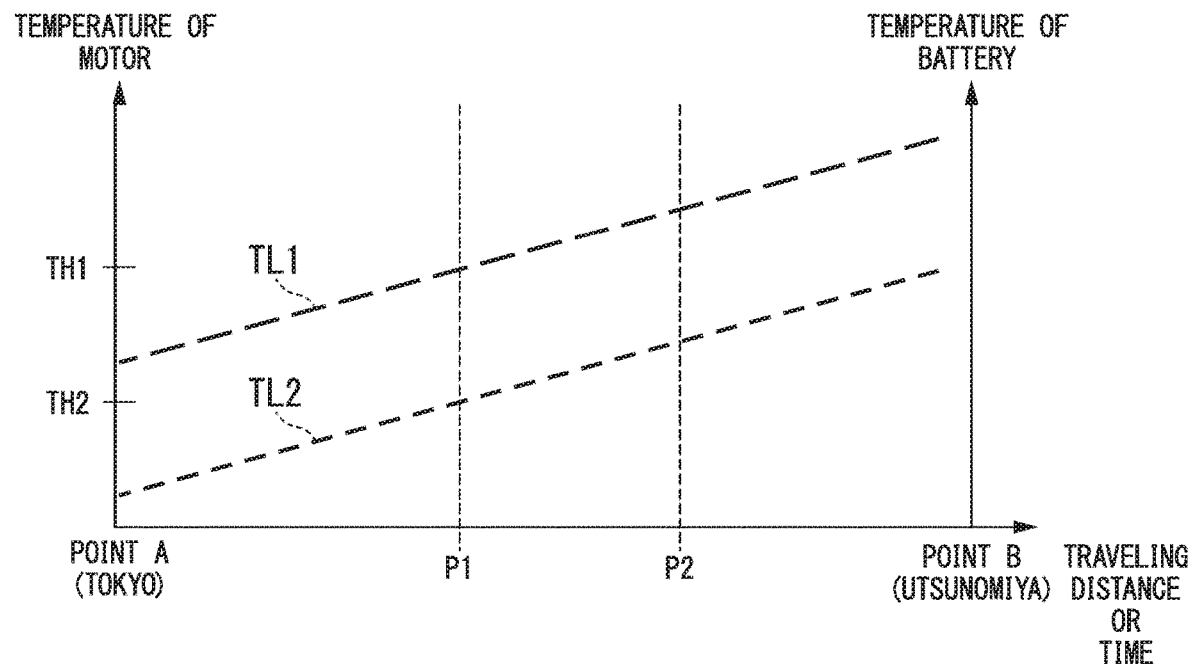
FIG. 6 is a diagram showing an example of contents of first learning information.

FIG. 6 is a diagram showing an example of contents of the first learning information 232. In FIG. 6, the vertical axis represents the temperature of the second motor 18 or the temperature of the battery 60, and the horizontal axis represents a distance or a time. In the example shown in the drawing, a transition line TL1 representing an increasing trend of the temperature of the second motor 18 and a transition line TL2 representing an increasing trend of the temperature of the battery 60 when a vehicle has been controlled according to a traveling plan and an operation plan are shown. The heat exchange plan creator 220 determines that the temperature of the second motor 18 increases to a threshold value TH1 or higher at point P1 and the temperature of the battery 60 increases to a threshold value TH2 or higher at point P1 according to the trends represented by the transition lines TL1 and TL2.

When it is determined that the temperature of the second motor 18 increases to the threshold value TH1 or higher, the heat exchange plan creator 220 creates a heat exchange plan for the first heat exchange such that the temperature of the second motor 18 is kept at the threshold value TH1 or lower according to the traveling plan, the operation plan, and the second learning information 234. When it is determined that the temperature of the battery 60 increases to the threshold value TH2 or higher, the heat exchange plan creator 220 creates a heat exchange plan of the second heat exchange such that the temperature of the battery 60 is kept at the threshold value TH2 or lower according to the traveling plan, the operation plan, and the second learning information 234.

The second learning information 234 is information in which a decreasing trend of the temperature of the second motor 18 is correlated with contents of the traveling plan, the operation plan, and the heat exchange plan of the first heat exchange. The second learning information 234 is information in which a decreasing trend of the temperature of the battery 60 is correlated with contents of the traveling plan, the operation plan, and the heat exchange plan of the second heat exchange. The second learning information 234 is, for example, information which is acquired by experiment or information which is generated according to simulation or the like.

Figure 7:
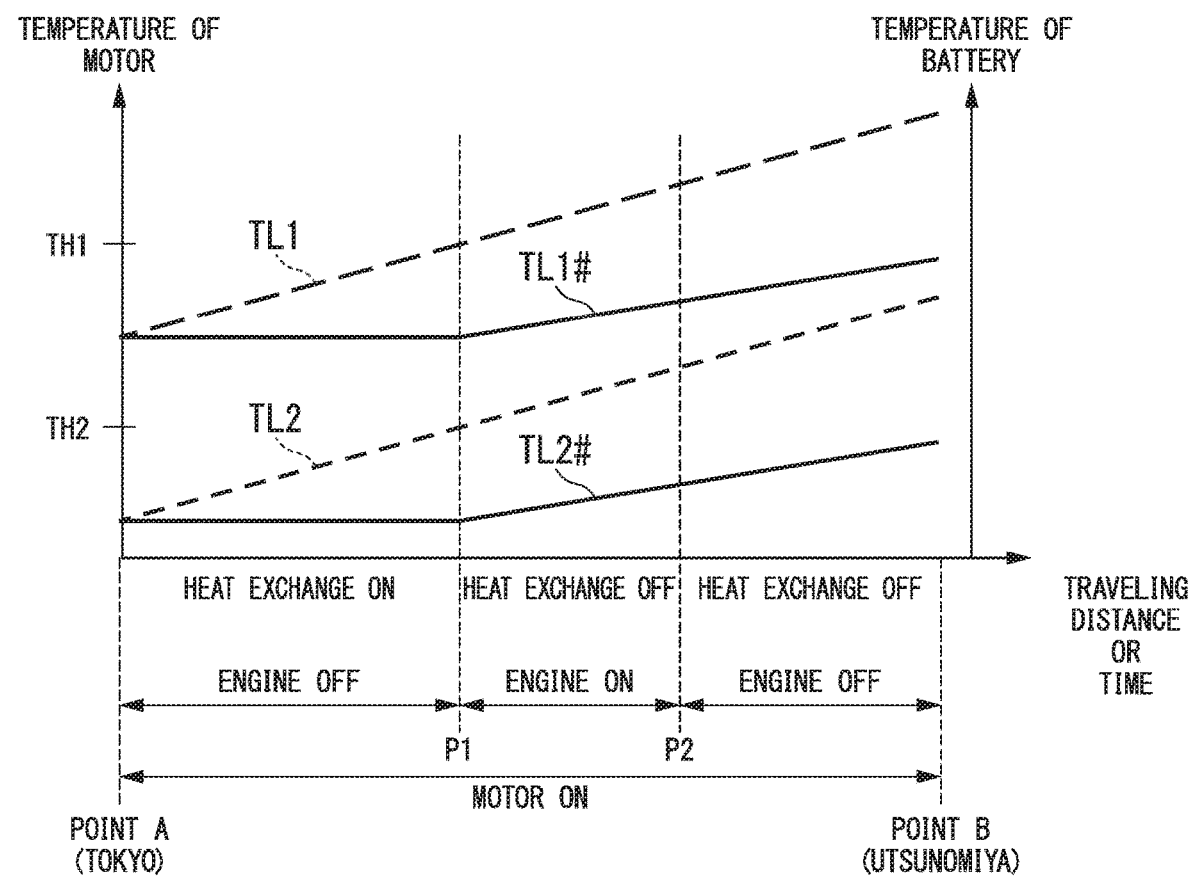
FIG. 7 is a diagram showing an example of contents of second learning information.

FIG. 7 is a diagram showing an example of contents of the second learning information 234. The same details as shown in FIG. 6 will not be repeated. In the example shown in the drawing, when a vehicle has been controlled according to a traveling plan and an operation plan, a transition line TL1# representing a decreasing trend of the temperature of the second motor 18 which is estimated when the heat exchange plan of the first heat exchange has been implemented and a transition line TL2# representing a decreasing trend of the temperature of the battery 60 which is estimated when the heat exchange plan of the second heat exchange has been implemented are shown.

The heat exchange plan creator 220 determines whether the temperature of the second motor 18 can be kept at the threshold value TH1 or lower or the temperature of the battery 60 can be kept at the threshold value TH2 or lower in accordance with the created heat exchange plan according to the trends represented by the transition lines TL1# and TL2#. The when the determination result is positive, the heat exchange plan creator 220 determines that the temperature of the second motor 18 can be kept at the threshold value TH1 or lower or the temperature of the battery 60 can be kept at the threshold value TH2 or lower in accordance with the created heat exchange plan when the created traveling plan and the created operation plan have been implemented.

In the example shown in the drawing, heat exchange is performed in the section from point A (Tokyo) to point P1 (the section in which the engine 10 does not operate) and heat exchange is not performed in the section from point P1 to point B (Utsunomiya) (the section in which the engine 10 operates or has operated).

In addition to the heat exchange plan of the first heat exchange and the heat exchange plan of the second heat exchange, the heat exchange plan creator 220 may make a cooling plan which is implemented by the motor-side cooling circuits L2-1 and L2-2 in a state in which the engine-side pump 102 does not operate, the motor-side pump 108 operates, or a cooling plan which is implemented by the battery-side cooling circuits L4-1 and L4-2 in a state in which the valve 115 is not controlled such that it is switched to the open state and the battery-side pump 122 operates.

[Other Advantages]

Figure 8:
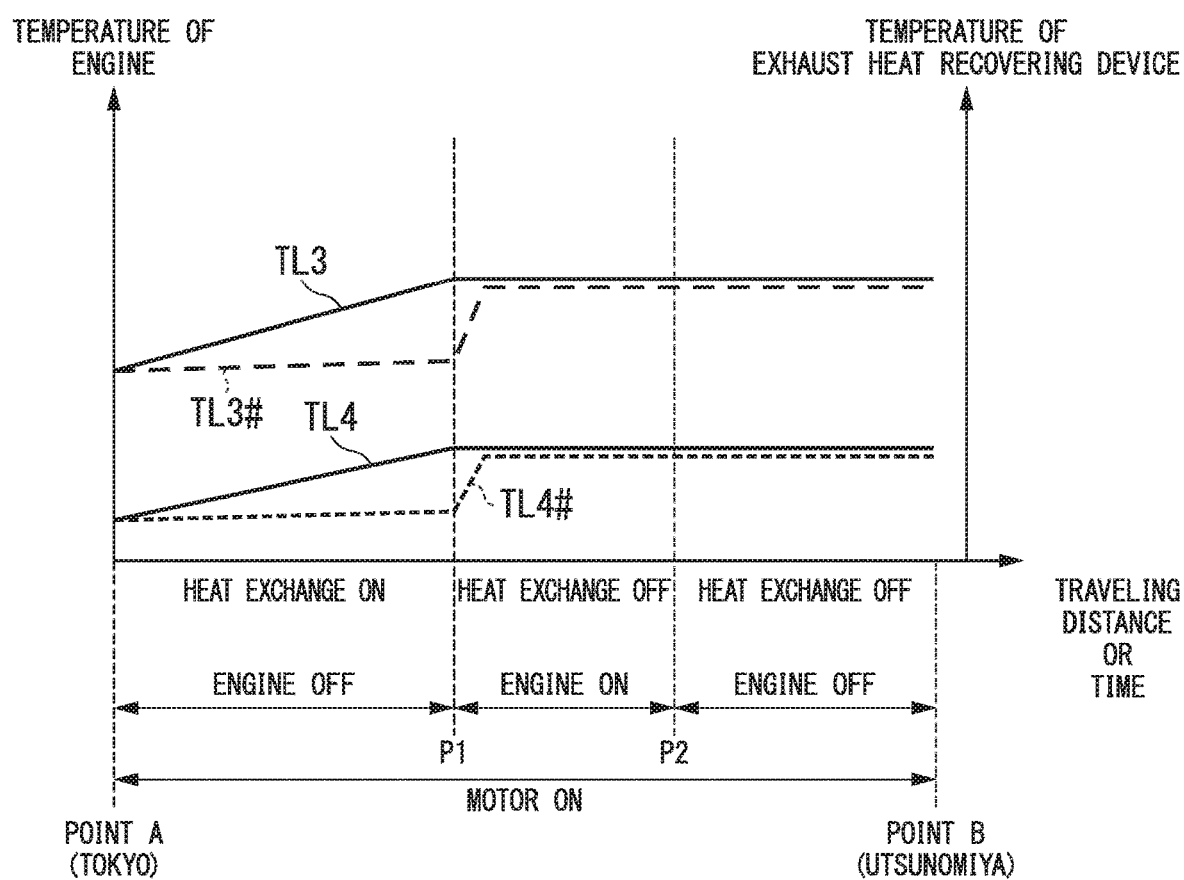
FIG. 8 is a diagram showing an example of a transition of a temperature of an engine and a temperature of an exhaust heat recovering device in a section from point A (Tokyo) to point B (Utsunomiya)

As described above, by performing heat exchange before the engine 10 operates, it is possible to efficiently operate the engine 10 or to use exchanged heat for operating of heating equipment. FIG. 8 is a diagram showing an example of transitions of the temperature of the engine 10 and the temperature of the exhaust heat recovering device 11 in the section from point A (Tokyo) to point B (Utsunomiya). The same details as shown in FIG. 7 will not be repeated. In FIG. 8, the vertical axis represents the temperature of the engine 10 or the temperature of the exhaust heat recovering device 11.

A transition line TL3 represents a transition of the temperature of the engine 10 when heat exchange is performed by the first heat exchanger 106 in the section from point A (Tokyo) to point P1 (hereinafter referred to as a target section). A transition line TL3# represents a transition of the temperature of the engine 10 when heat exchange is not performed by the first heat exchanger 106 in the target section.

When heat exchange is performed in this way, the temperature of the engine has an increasing trend even in a state in which the engine 10 does not operate in comparison with a case in which heat exchange is not performed. When the engine 10 operates, the engine 10 can operated in a state in which the temperature of the engine 10 increases in comparison with a case in which heat exchange is not performed. As a result, it is possible to more efficiently operate the engine 10.

A transition line TL4 represents a transition of the temperature of the exhaust heat recovering device 11 when heat exchange is performed by the second heat exchanger 120 in the target section. A transition line TL4# represents a transition of the temperature of the exhaust heat recovering device 11 when heat exchange is not performed by the second heat exchanger 120 in the target section.

When heat exchange is performed in this way, the temperature of the exhaust heat recovering device 11 has an increasing trend even in a state in which the engine 10 does not operate in comparison with a case in which heat exchange is not performed. The heat recovered by the exhaust heat recovering device 11 can be used, for example, as a heat source for heating.

By performing heat exchange as described above, it is possible to effectively use heat which has not been used in a vehicle. As a result, it is possible to more efficiently use thermal energy which is generated in the vehicle.

[Flowchart]

Figure 9:
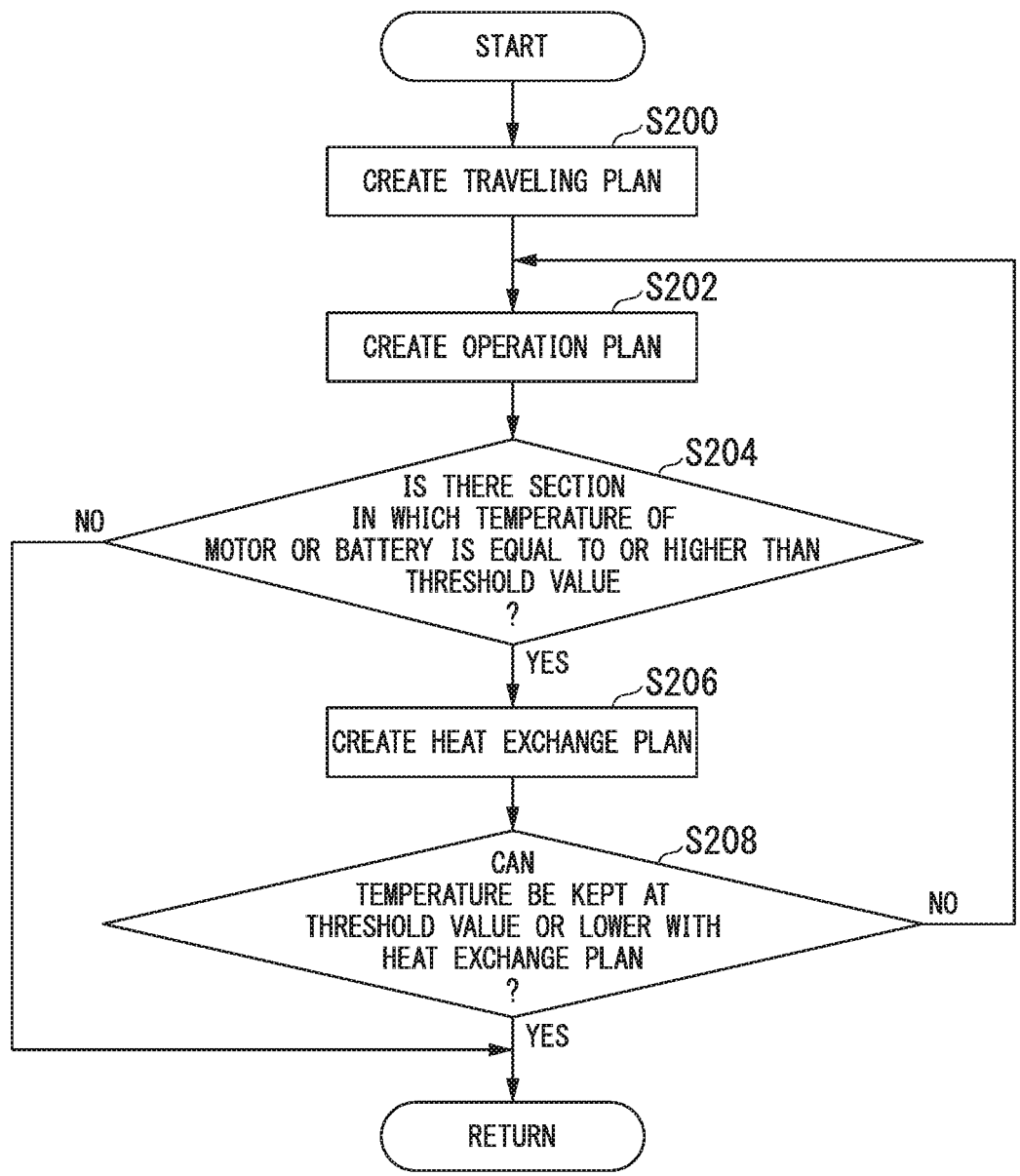

FIG. 9 is a flowchart showing a flow of a process routine which is performed by the heat exchange plan creator 220 or the like. First, the navigator 200 creates a traveling plan (Step S200). Then, the operation plan creator 210 creates an operation plan according to the traveling plan (Step S202).

Then, the heat exchange plan creator 220 determines whether there is a section in which the temperature of the second motor 18 or the temperature of the battery 60 is equal to or higher than a threshold value (Step S204). When there is not a section in which the temperature of the second motor 18 or the temperature of the battery 60 is equal to or higher than the threshold value, this process routine of the flowchart ends. That is, the vehicle travels according to the traveling plan and the operation plan which are created in the processes.

When there is a section in which the temperature of the second motor 18 or the temperature of the battery 60 is equal to or higher than the threshold value, the heat exchange plan creator 220 creates a heat exchange plan (Step S206). Then, the heat exchange plan creator 220 determines whether the temperature of the second motor 18 or the temperature of the battery 60 can be kept at the threshold value or lower with the created heat exchange plan (Step S208). For example, the heat exchange plan creator 220 creates a plurality of heat exchange plans, and employs a heat exchange plan which is most effective (which can best keep the temperature of the second motor 18 or the temperature of the battery 60) among the created heat exchange plans.

When the temperature of the second motor 18 or the temperature of the battery 60 cannot be kept at the threshold value or lower, the process routine returns to Step S202. That is, the heat exchange plan creator 220 determines that the temperature of the second motor 18 or the temperature of the battery 60 cannot be kept at the threshold value or lower by the heat exchange. Then, the operation plan creator 210 creates an operation plan again.

When it is determined in Step S208 that the temperature of the second motor 18 or the temperature of the battery 60 can be kept at the threshold value or lower, this process routine of the flowchart ends. That is, the vehicle travels according to the traveling plan, the operation plan, and the heat exchange plan which are created in the processes.

Figure 10:
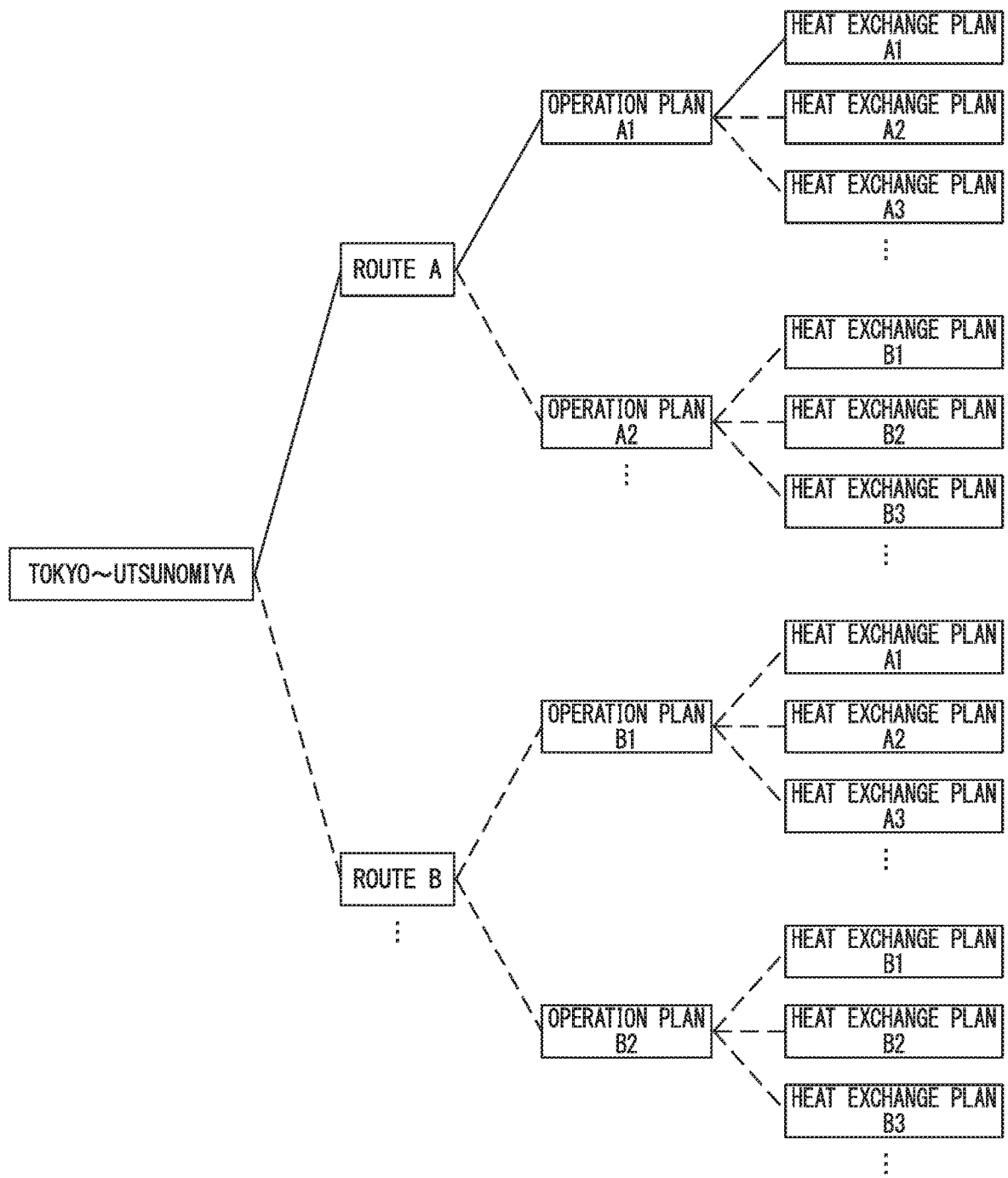
FIG. 10 is a diagram conceptually showing the process routine in the flowchart shown in FIG. 9.

FIG. 10 is a diagram conceptually showing the process routine of the flowchart shown in FIG. 9. For example, when routes A, B, . . . from point A (Tokyo) to point B (Utsunomiya) are derived and the route A is selected by an occupant, the vehicle system 1 creates operation plans A1, A2, . . . for the route A and heat exchange plans A1, A2, . . . for the operation plan A1. Then, the vehicle system 1 employs the most effective heat exchange plan among the created heat exchange plans. When there is not heat exchange plan satisfying a reference condition, the vehicle system 1 changes the operation plan from the operation plan A1 to the operation plan A2 and creates heat exchange plans B1, B2, . . . for the operation plan A2 in the same way as described above. Then, the vehicle system 1 employs the most effective heat exchange plan among the created heat exchange plans.

According to the second embodiment, even when there is a section in which the temperature of the second motor 18 or the temperature of the battery 60 is equal to or higher than the threshold value, it is possible to more accurately manage heat in a vehicle by creating a heat exchange plan capable of keeping the temperature of the second motor 18 or the temperature of the battery 60 at a threshold value or lower.

According to the above-mentioned embodiments, since the heat exchange system includes the engine-side (first) cooling circuits L1-1 and L1-2 that cool the engine 10, the motor-side (second) cooling circuits L2-1 and L2-2 that cool the second motor 18 which outputs a driving force for traveling, the first heat exchanger 106 that performs heat exchange between the engine-side cooling circuits L1-1 and L1-2 and the motor-side cooling circuits L2-1 and L2-2, the first sensor 151 that detects the temperatures of the engine-side cooling circuits L1-1 and L1-2, the second sensor 152 that detects the temperatures of the motor-side cooling circuits L2-1 and L2-2, and the controller 155 that executes control of performing heat exchange between the coolants in the engine-side cooling circuits L1-1 and L1-2 and the coolants in the motor-side cooling circuits L2-1 and L2-2 using the first heat exchanger 106 when the temperature detected by the first sensor 151 is lower than the temperature detected by the second sensor 152, it is possible to more accurately manage heat in a vehicle.

[Hardware Configuration]

Figure 11:
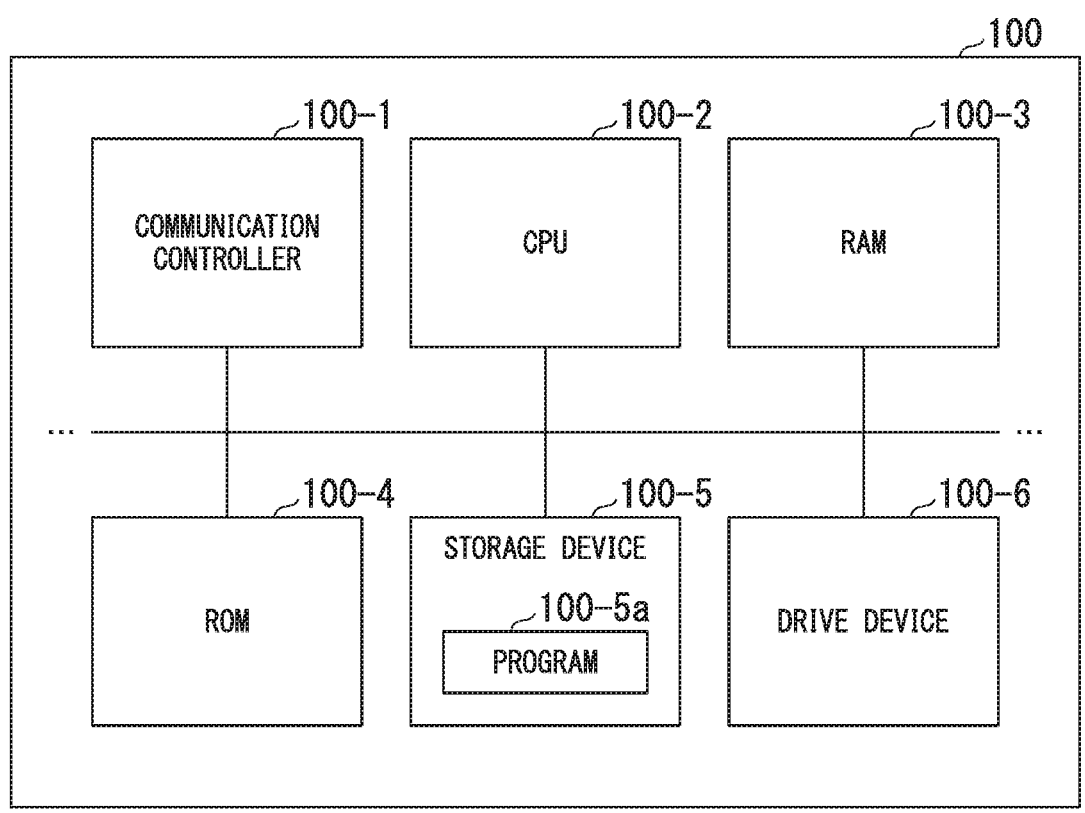
FIG. 11 is a diagram showing an example of a hardware configuration of a controller according to the embodiments.

The controller (the controller 155, the navigator 200, the operation plan creator 210, and the heat exchange plan creator 220) of the vehicle system 1 according to the above-mentioned embodiments is embodied, for example, by a hardware configuration shown in FIG. 11. FIG. 11 is a diagram showing an example of a hardware configuration of the controller according to the embodiments.

The controller has a configuration in which a communication controller 100-1, a CPU 100-2, a RAM 100-3, a ROM 100-4, a storage device 100-5 such as a flash memory or a hard disk drive (HDD), and a drive device 100-6 are connected to each other via an internal bus or a dedicated communication line. A portable storage medium such as an optical disc is attached to the drive device 100-6. By causing a DMA controller (not shown) or the like to load a program 100-5*a* stored in the storage device 100-5 into the RAM 100-3 and causing the CPU 100-2 to execute the loaded program, the controller is embodied. The program referred to by the CPU 100-2 may be stored in the portable storage medium attached to the drive device 100-6 or may be downloaded from another HDD or a flash memory in advance, or may be stored in a detachable storage medium such as a DVD or a CD-ROM and be installed in the storage device by attaching the storage medium to the drive device.

The above-mentioned embodiments can be expressed as follows:

A heat exchange system for a vehicle, including:

a first cooling circuit is configured to cool an internal combustion engine;

a second cooling circuit is configured to cool a driving electric motor which outputs a driving force for traveling;

a first heat exchanger is configured to exchange heat between a coolant in the first cooling circuit and a coolant in the second cooling circuit;

a first sensor is configured to detect a temperature of the first cooling circuit;

a second sensor is configured to detect a temperature of the second cooling circuit;

a storage device; and a hardware processor is configured to execute a program stored in the storage device and is configured to execute control of performing heat exchange between the coolant in the first cooling circuit and the coolant in the second cooling circuit using the first heat exchanger when the temperature detected by the first sensor is lower than the temperature detected by the second sensor.

While embodiments of the invention have been described above, the invention is not limited to the embodiments and can be subjected to various modifications and substitutions without departing from the gist of the invention.

What is claimed is:

1. A heat exchanger system for a vehicle, comprising:
   a first cooling circuit configured to cool an internal combustion engine;
   a second cooling circuit configured to cool a driving electric motor which outputs a driving force for traveling;
   a first heat exchanger configured to exchange heat between a coolant in the first cooling circuit and a coolant in the second cooling circuit;
   a first sensor configured to detect a temperature of the first cooling circuit;
   a second sensor configured to detect a temperature of the second cooling circuit; and
   a controller configured to execute control of performing heat exchange between the coolant in the first cooling circuit and the coolant in the second cooling circuit using the first heat exchanger when the temperature detected by the first sensor is lower than the temperature detected by the second sensor.

2. The heat exchange system for a vehicle according to claim 1, wherein the controller is configured to execute control of performing the heat exchange using the first heat exchanger according to an operation plan of the internal combustion engine.

3. The heat exchange system for a vehicle according to claim 2, further comprising an operation plan creator configured to create an operation plan of the driving electric motor and the internal combustion engine according to a traveling plan of the vehicle in which the heat exchange system for a vehicle is mounted.

4. The heat exchange system for a vehicle according to claim 3, further comprising a heat exchange plan creator configured to create a heat exchange plan for executing control of performing the heat exchange using the first heat exchanger according to the operation plan of the internal combustion engine.

5. The heat exchange system for a vehicle according to claim 4, wherein the heat exchange plan is a plan in which the temperature of the driving electric motor is curbed to be lower than a first threshold value.

6. The heat exchange system for a vehicle according to claim 1, further comprising:
   a third cooling circuit disposed in an exhaust heat recovering device connected to the internal combustion engine;
   a fourth cooling circuit configured to cool a storage battery which supplies electric power to the driving electric motor;
   a second heat exchanger configured to exchange heat between the third cooling circuit and the fourth cooling circuit;
   a third sensor configured to detect a temperature of the third cooling circuit; and
   a fourth sensor configured to detect a temperature of the fourth cooling circuit,
   wherein the controller is configured to execute control of performing heat exchange between the third cooling circuit and the fourth cooling circuit using the second heat exchanger when the temperature detected by the third sensor is lower than the temperature detected by the fourth sensor.

7. The heat exchange system for a vehicle according to claim 6, wherein the controller is configured to execute control of performing the heat exchange using the second heat exchanger according to an operation plan of the internal combustion engine.

8. The heat exchange system for a vehicle according to claim 7, further comprising a heat exchange plan creator configured to create a heat exchange plan for executing control of performing the heat exchange using the second heat exchanger according to the operation plan of the internal combustion engine.

9. The heat exchange system for a vehicle according to claim 8, wherein the heat exchange plan is a plan in which the temperature of the storage battery supplying electric power to the driving electric motor is curbed to be lower than a second threshold value.

10. A heat exchange method for a vehicle, causing a computer to perform:
    detecting a temperature of a first cooling circuit configured to cool an internal combustion engine;
    detecting a temperature of a second cooling circuit configured to cool a driving electric motor which outputs a driving force for traveling; and
    executing control of performing heat exchange between a cooling in the first cooling circuit and a coolant in the second cooling circuit using a first heat exchanger configured to exchange heat between the coolant in the first cooling circuit and the coolant in the second cooling circuit when the temperature of the first cooling circuit is lower than the temperature of the second cooling circuit.

11. A non-transitory computer-readable storage medium that stores a computer program to be executed by a computer to perform at least:
    detect a temperature of a first cooling circuit configured to cool an internal combustion engine;
    detect a temperature of a second cooling circuit configured to cool a driving electric motor which outputs a driving force for traveling; and
    execute control of performing heat exchange between a coolant in the first cooling circuit and a coolant in the second cooling circuit using a first heat exchanger configured to exchange heat between the coolant in the first cooling circuit and the coolant in the second cooling circuit when the temperature of the first cooling circuit is lower than the temperature of the second cooling circuit.

* * * * *